(12) United States Patent
Kobayashi et al.

(10) Patent No.: US 12,116,754 B2
(45) Date of Patent: Oct. 15, 2024

(54) OPERATION AREA PRESENTATION DEVICE AND OPERATION AREA PRESENTATION METHOD

(71) Applicant: Komatsu Ltd., Tokyo (JP)

(72) Inventors: Hidehiko Kobayashi, Tokyo (JP); Masaaki Uetake, Tokyo (JP); Takahiro Hashimoto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 365 days.

(21) Appl. No.: 17/769,794

(22) PCT Filed: Nov. 18, 2020

(86) PCT No.: PCT/JP2020/043077
§ 371 (c)(1),
(2) Date: Apr. 18, 2022

(87) PCT Pub. No.: WO2021/100785
PCT Pub. Date: May 27, 2021

(65) Prior Publication Data
US 2022/0356680 A1  Nov. 10, 2022

(30) Foreign Application Priority Data
Nov. 21, 2019 (JP) ................ 2019-210808

(51) Int. Cl.
*E02F 9/26* (2006.01)
*E02F 9/24* (2006.01)

(52) U.S. Cl.
CPC ............. *E02F 9/261* (2013.01); *E02F 9/24* (2013.01)

(58) Field of Classification Search
CPC ....................................... E02F 9/261
See application file for complete search history.

(56) References Cited

U.S. PATENT DOCUMENTS

| | | |
|---|---|---|
| 2002/0033833 A1 | 3/2002 | Kinugawa et al. |
| 2003/0001750 A1 | 1/2003 | Ishimoto et al. |
| 2004/0210371 A1 | 10/2004 | Adachi et al. |
| 2015/0161969 A1 | 6/2015 | Zaizen et al. |
| 2018/0245315 A1 | 8/2018 | Kaiso et al. |
| 2020/0327464 A1 | 10/2020 | Kato et al. |
| 2020/0380620 A1 | 12/2020 | Onishi et al. |

FOREIGN PATENT DOCUMENTS

| | | |
|---|---|---|
| JP | 2002-088821 A | 3/2002 |
| JP | 2002-091547 A | 3/2002 |
| JP | 2002-105989 A | 4/2002 |
| JP | 2002-358598 A | 12/2002 |
| JP | 2003-027528 A | 1/2003 |
| JP | 2013-235485 A | 11/2013 |
| JP | 2018-141314 A | 9/2018 |
| JP | 2019-002242 A | 1/2019 |
| JP | 2019-175367 A | 10/2019 |
| WO | 2019/017173 A1 | 1/2019 |

*Primary Examiner* — Aryan E Weisenfeld
(74) *Attorney, Agent, or Firm* — Locke Lord LLP

(57) ABSTRACT

In an operation area presentation device according to the present invention, a reception unit is configured to receive history data of a position of an operation site in which a work machine is present. A calculation unit is configured to calculate a staying time of the work machine for each of a plurality of areas of the operation site. A generation unit is configured to generate an operation area map obtained by mapping the staying time for each of the plurality of areas to a map of the operation site. An output unit is configured to output the generated operation area map.

4 Claims, 6 Drawing Sheets

OPERATION AREA PRESENTATION DEVICE AND OPERATION AREA PRESENTATION METHOD

TECHNICAL FIELD

The present disclosure relates to an operation area presentation device of a work machine and an operation area presentation method.

Priority is claimed on Japanese Patent Application No. 2019-210808, filed Nov. 21, 2019, the content of which is incorporated herein by reference.

BACKGROUND ART

Patent Document 1 discloses the technology that, in order to prevent a work machine from overturning, when the center of gravity of the work machine is in an area in which there is a possibility of collapse, a warning for issuing a notification of the danger of overturning is issued or a control to prevent overturning is performed.

CITATION LIST

Patent Document

[Patent Document 1]
Japanese Unexamined Patent Application, First Publication No. 2019-002242

SUMMARY OF INVENTION

Technical Problem

In order to allow an operator of the work machine or a manager of an operation site to confirm the stability of the operation of the work machine, an incident report representing a warning notification history from the work machine may be generated. The operator and the manager can confirm the stability of the operation of the work machine by the operator by visually recognizing the report.

By the way, a possibility of occurrence of an incident risk related to the work machine differs depending on the area in which the work machine is operated. For example, in a case in which the work machine is operated on rough ground, a risk of overturning of the work machine is greater than a case in which the work machine is operated on flat ground. Therefore, when the operator and the manager visually recognize the report representing the notification history of the warning, it is difficult to recognize whether the incident risk is caused by the operator of the work machine or caused by the work being performed in an area having a high possibility of the incident risk in the first place.

An object of the present disclosure is to provide an operation area presentation device and an operation area presentation method to solve the problems described above.

Solution to Problem

An aspect of the present invention relates to an operation area presentation device including a reception unit configured to receive history data of a position of an operation site in which a work machine is present, a calculation unit configured to calculate a staying time of the work machine for each of a plurality of areas of the operation site, a generation unit configured to generate an operation area map obtained by mapping the staying time for each of the plurality of areas to a map of the operation site, and an output unit configured to output the generated operation area map.

Advantageous Effects of Invention

According to the aspect described above, the operator and the manager can recognize which area of the operation site the work machine stays for a long time by visually recognizing the operation area map. Therefore, by visually recognizing the operation area map, the operator or the manager can easily recognize whether the incident risk is caused by an inappropriate manipulation of the work machine or is caused by the work machine being present in an area having a high possibility of the incident risk. For example, in a case in which there is the incident risk while the work machine stays in an area having a high possibility of the incident risk for a long time, the operator or the manager can infer that there is a low possibility in that the incident risk was caused by an inappropriate manipulation of the work machine. In addition, for example, in a case in which there is the incident risk even though the work machine stays in an area having a low possibility of the incident risk for a long time, the operator or the manager can infer that there is a high possibility in that the incident risk was caused by an inappropriate manipulation of the work machine.

DESCRIPTION OF EMBODIMENTS

First Embodiment

<<Configuration of Risk Management System 1>>

In the following, an embodiment will be described in detail with reference to the drawings.

Figure 1:
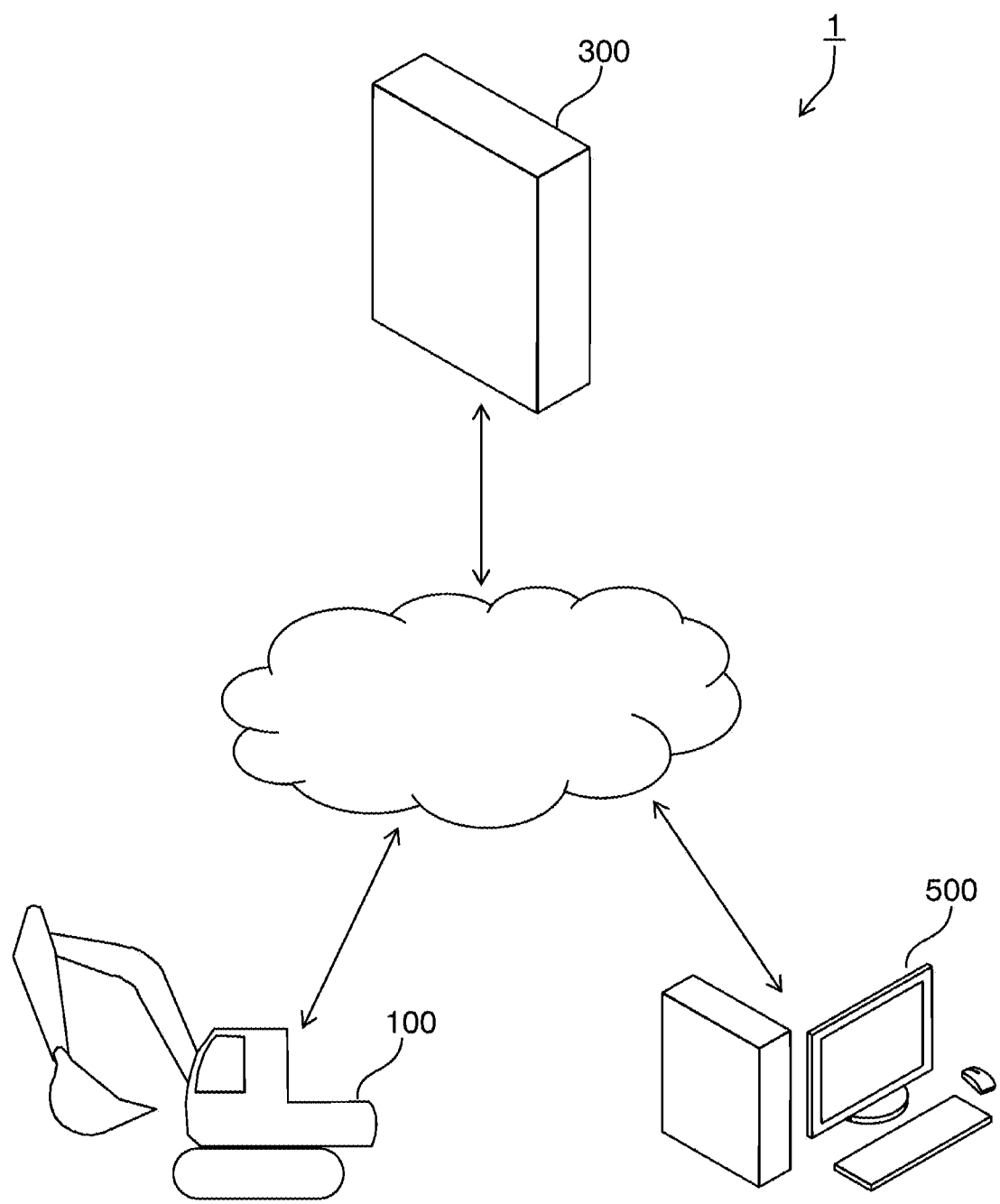
FIG. 1 is a schematic diagram showing a configuration of a risk management system according to a first embodiment.

FIG. 1 is a schematic diagram showing a configuration of a risk management system 1 according to a first embodiment. The risk management system 1 presents an incident report related to a risk of occurrence of an incident related to a work machine 100 to a user. Exemplary examples of the user include a manager at an operation site or an operator of the work machine 100. By visually recognizing the incident report, the user can study the maintenance of the operation site and give a guide on the operation by the operator.

The risk management system 1 includes the work machine 100, a report generation device 300, and a user terminal 500. The work machine 100, the report generation device 300, and the user terminal 500 are connected to be communicable via a network.

For example, in a case in which the work machine 100 is a hydraulic excavator, the work machine 100 is operated at a construction site and performs earth excavation work. In addition, the work machine 100 issues a warning for notifying the operator of the incident risk in a case of determining that there is a predetermined incident risk based on a work state. Details of the determination on the incident risk will be described later. Exemplary examples of the incident risk include a collision risk, an overturning risk, and a compliance violation risk. The work machine 100 shown in FIG. 1 is the hydraulic excavator, but it may be another work machine in another embodiment. Exemplary examples of the work machine 100 include a bulldozer, a dump truck, a forklift, a wheel loader, and a motor grader.

The report generation device 300 generates incident report data summarizing the risk of the occurrence of the incident related to the work machine 100.

The user terminal 500 displays or prints the incident report data generated by the report generation device 300.

<<Configuration of Work Machine 100>>

Figure 2:
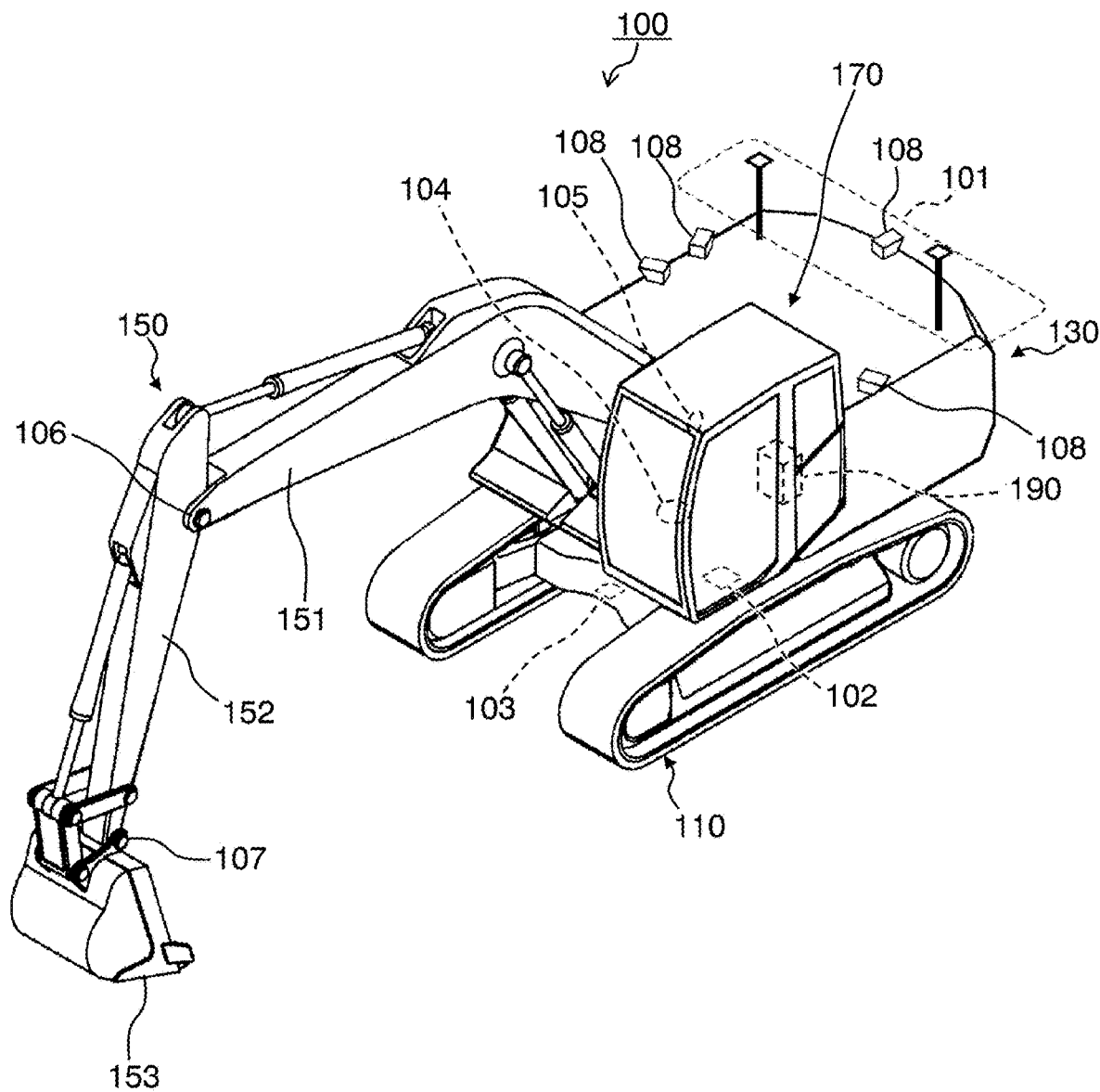
FIG. 2 is a diagram showing a configuration of a work machine according to the first embodiment.

FIG. 2 is a diagram showing a configuration of the work machine 100 according to the first embodiment.

The work machine 100 includes an undercarriage 110, a swing body 130, work equipment 150, a cab 170, and a control device 190.

The undercarriage 110 supports the work machine 100 to be able to travel. The undercarriage 110 is, for example, a pair of right and left continuous tracks.

The swing body 130 is supported by the undercarriage 110 to be able to swing about a swing center.

The work equipment 150 is supported by a front portion of the swing body 130 to be able to be driven in a vertical direction. The work equipment 150 is driven by a hydraulic pressure. The work equipment 150 includes a boom 151, an arm 152, and a bucket 153. A base end portion of the boom 151 is attached to the swing body 130 via a pin. A base end portion of the arm 152 is attached to a distal end portion of the boom 151 via a pin. A base end portion of the bucket 153 is attached to a distal end portion of the arm 152 via a pin. Here, a portion of the swing body 130 to which the work equipment 150 is attached is referred to as the front portion. In addition, a portion on an opposite side of the front portion of the swing body 130 is referred to as a rear portion, a portion on a left side thereof is referred to as a left portion, and a portion on a right side thereof is referred to as a right portion.

The cab 170 is provided in the front portion of the swing body 130. In the cab 170, a manipulation device that manipulates the work machine 100 and a warning device that issues a warning of the incident risk warning are provided.

The control device 190 controls the undercarriage 110, the swing body 130, and the work equipment 150 based on the manipulation of the operator. The control device 190 is provided, for example, inside the cab. The control device 190 is an exemplary example of an operation area presentation device.

The work machine 100 includes a plurality of sensors that detects the work state of the work machine 100. Specifically, the work machine 100 includes a position/azimuth direction detector 101, an inclination detector 102, a travel acceleration sensor 103, a swing angle sensor 104, a boom angle sensor 105, an arm angle sensor 106, a bucket angle sensor 107, and a plurality of imaging devices 108.

The position/azimuth direction detector 101 calculates a position of the swing body 130 in a site coordinate system and an azimuth direction in which the swing body 130 faces. The position/azimuth direction detector 101 includes two antennas that receive positioning signals from artificial satellites configuring a GNSS. The two antennas are each installed at different positions on the swing body 130. For example, the two antennas are provided in a counterweight portion of the swing body 130. The position/azimuth direction detector 101 detects the position of a representative point of the swing body 130 in the site coordinate system based on the positioning signal received by at least one of the two antennas. The position/azimuth direction detector 101 detects the azimuth direction of the swing body 130 in the site coordinate system by using the positioning signal received by each of the two antennas.

The inclination detector 102 measures the acceleration and the angular velocity of the swing body 130 and detects the inclination (for example, a roll angle and a pitch angle) of the swing body 130 with respect to a horizontal plane based on the measurement result. The inclination detector 102 is installed, for example, below the cab 170. Exemplary examples of the inclination detector 102 is an inertial measurement unit (IMU).

The travel acceleration sensor 103 is provided in the undercarriage 110 and detects the acceleration related to the traveling of the work machine 100.

The swing angle sensor 104 is provided at the swing center of the swing body 130 and detects swing angles of the undercarriage 110 and the swing body 130.

The boom angle sensor 105 is provided in the pin connecting the swing body 130 and the boom 151 and detects a boom angle that is a rotation angle of the boom 151 with respect to the swing body 130.

The arm angle sensor 106 is provided in the pin connecting the boom 151 and the arm 152 and detects an arm angle that is a rotation angle of the arm 152 with respect to the boom 151.

The bucket angle sensor 107 is provided in the pin connecting the arm 152 and the bucket 153 and detects a bucket angle that is a rotation angle of the bucket 153 with respect to the arm 152.

Each of the plurality of imaging devices 108 is provided in the swing body 130. Imaging ranges of the plurality of imaging devices 108 covers at least a range that cannot be visually recognized from the cab 170 in the entire circumference of the work machine 100.

Figure 3:
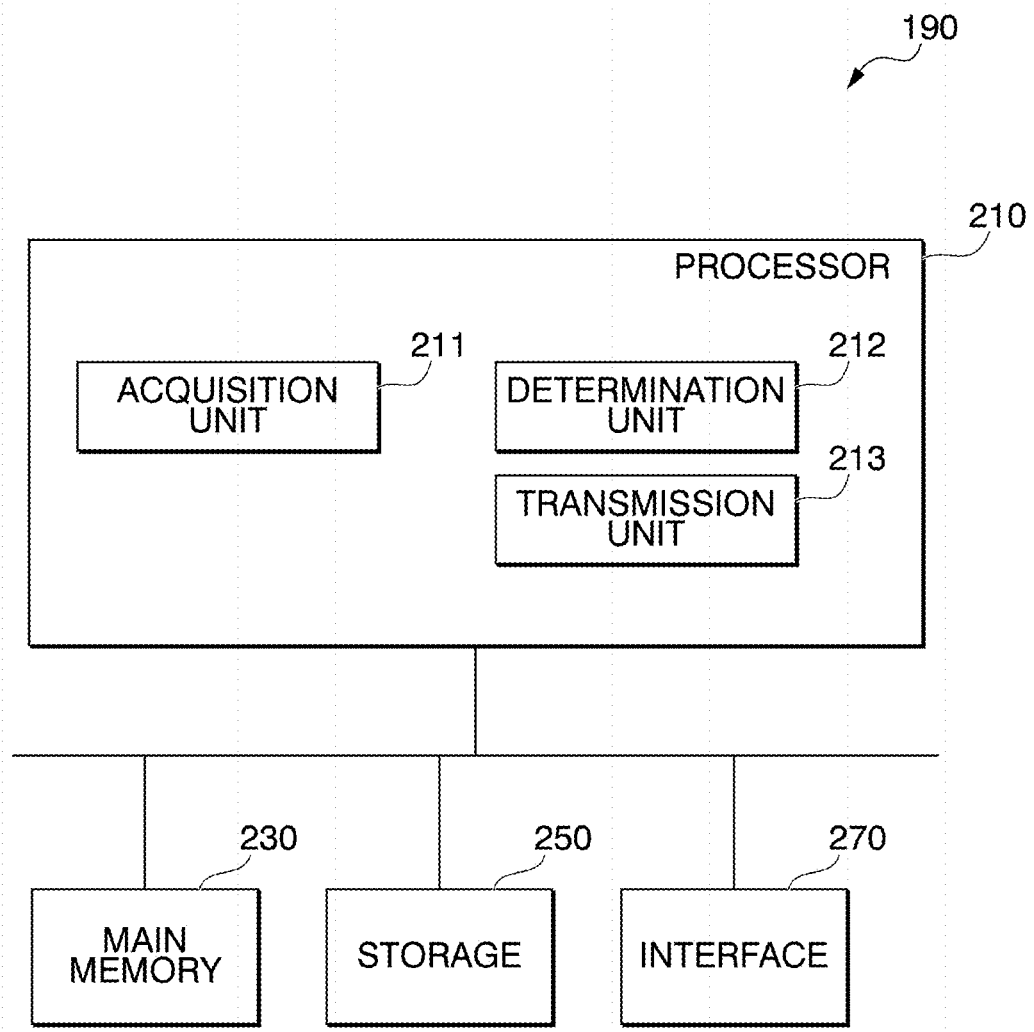
FIG. 3 is a schematic block diagram showing a configuration of a control device according to the first embodiment.

FIG. 3 is a schematic block diagram showing a configuration of the control device 190 according to the first embodiment.

The control device 190 is a computer that includes a processor 210, a main memory 230, a storage 250, and an interface 270.

The storage 250 is a non-transitory tangible storage medium. Exemplary examples of the storage 250 include a magnetic disk, an optical disk, a magneto-optical disk, and a semiconductor memory. The storage 250 may be an internal medium directly connected to a bus of the control device 190, or an external medium connected to the control device 190 via the interface 270 or a communication line. The storage 250 stores a program for controlling the work machine 100.

The program may be a program for realizing some of the functions exerted by the control device 190. For example, the program may exert the functions in combination with another program already stored in the storage 250, or in combination with another program mounted on another device. In addition, in another embodiment, the control device 190 may include a custom large scale integrated circuit (LSI), such as a programmable logic device (PLD), in addition to or in place of the configuration described above. Exemplary examples of the PLD include a programmable array logic (PAL), a generic array logic (GAL), a complex programmable logic device (CPLD), and a field programmable gate array (FPGA). In this case, some or all of the functions realized by the processor may be realized by an integrated circuit.

The processor 210 functions as an acquisition unit 211, a determination unit 212, and a transmission unit 213 by executing the program.

The acquisition unit 211 acquires a measurement value from each of the position/azimuth direction detector 101, the inclination detector 102, the travel acceleration sensor 103, the swing angle sensor 104, the boom angle sensor 105, the arm angle sensor 106, the bucket angle sensor 107, and the imaging device 108. In addition, the measurement value of the imaging device 108 is a captured image.

In addition, at least position information, in the information acquired by the acquisition unit 211, acquired by the position/azimuth direction detector 101 is always stored at predetermined time intervals during the operation of the work machine 100, so that the position information is accumulated as position history data during the operation.

The determination unit 212 determines the presence or absence of the incident risk based on the measurement value acquired by the acquisition unit 211, and when determining that there is the incident risk, outputs an instruction for outputting the warning to the warning device. The warning device issues the warning to notify the operator of the presence of the incident risk when the instruction for outputting the warning is input. In addition, in addition to the method disclosed in Patent Document 1 described above, various known methods can be applied to the determination of the incident risk depending on the type of the work machine, and thus the detailed description thereof will be omitted here.

Here, exemplary examples of the incident risk include an overturning risk, a collision risk, and a compliance violation risk. Exemplary examples of the overturning risk include an unstable posture on a slope and an unstable posture at the time of cargo suspending work. Exemplary examples of the collision risk include intrusion of an obstacle or a person into a dangerous area, and inconsistency between an orientation of the undercarriage 110 and an orientation of the swing body 130 (that is, an orientation of the cab 170) at the time of traveling (hereinafter, "reversal of the orientation of the undercarriage 110"). Exemplary examples of the compliance violation risk include ignoring the warning and reversal of the orientation of the undercarriage 110 at the time of leaving the seat. In addition, non-fastening of a seat belt or drunk driving can be included in the compliance violation risk.

The overturning risk can be determined by calculating the posture of the work machine 100 based on the inclination of the work machine 100 with respect to the horizontal plane detected by the inclination detector 102, and also may be determined by calculating the center of gravity of the work machine as in Patent Document 1 described above. In addition, the posture of the work machine 100 may be calculated by further using the swing angle of the swing body 130, the angle of the work equipment 150, and the like, in addition to the inclination of the work machine 100 with respect to the horizontal plane.

The transmission unit 213 transmits the data indicating the history of the states of the work machine 100 when the warning is issued (hereinafter referred to as "warning history data") and the position history data during the operation to the report generation device 300. The warning history data includes a time when the instruction for outputting the warning is output, the measurement value at that time, and the position information of the work machine 100 at that time. When the determination unit 212 determines that there is the incident risk, the transmission unit 213 generates the warning history data by associating the time, the measurement value, and the position information at that time. The transmission unit 213 may transmit the history data, such as the warning history data or the position history data during the operation, to the report generation device 300 by batch processing at a predetermined transmission timing or may transmit the history data to the report generation device 300 in real time. When the history data is transmitted by the batch processing, the acquisition unit 211 records the history data in the storage 250, and the transmission unit 213 transmits the recorded history data to the report generation device 300. In addition, in order to reduce an amount of communication, the transmission unit 213 may compress the history data, as necessary, to transmit the compressed history data. The history data transmitted by the transmission unit 213 includes identification information of the operator who manipulates the work machine 100. The identification information of the operator is read out of an ID key, for example, when the work machine 100 is activated.

<<Configuration of Report Generation Device 300>>

Figure 4:
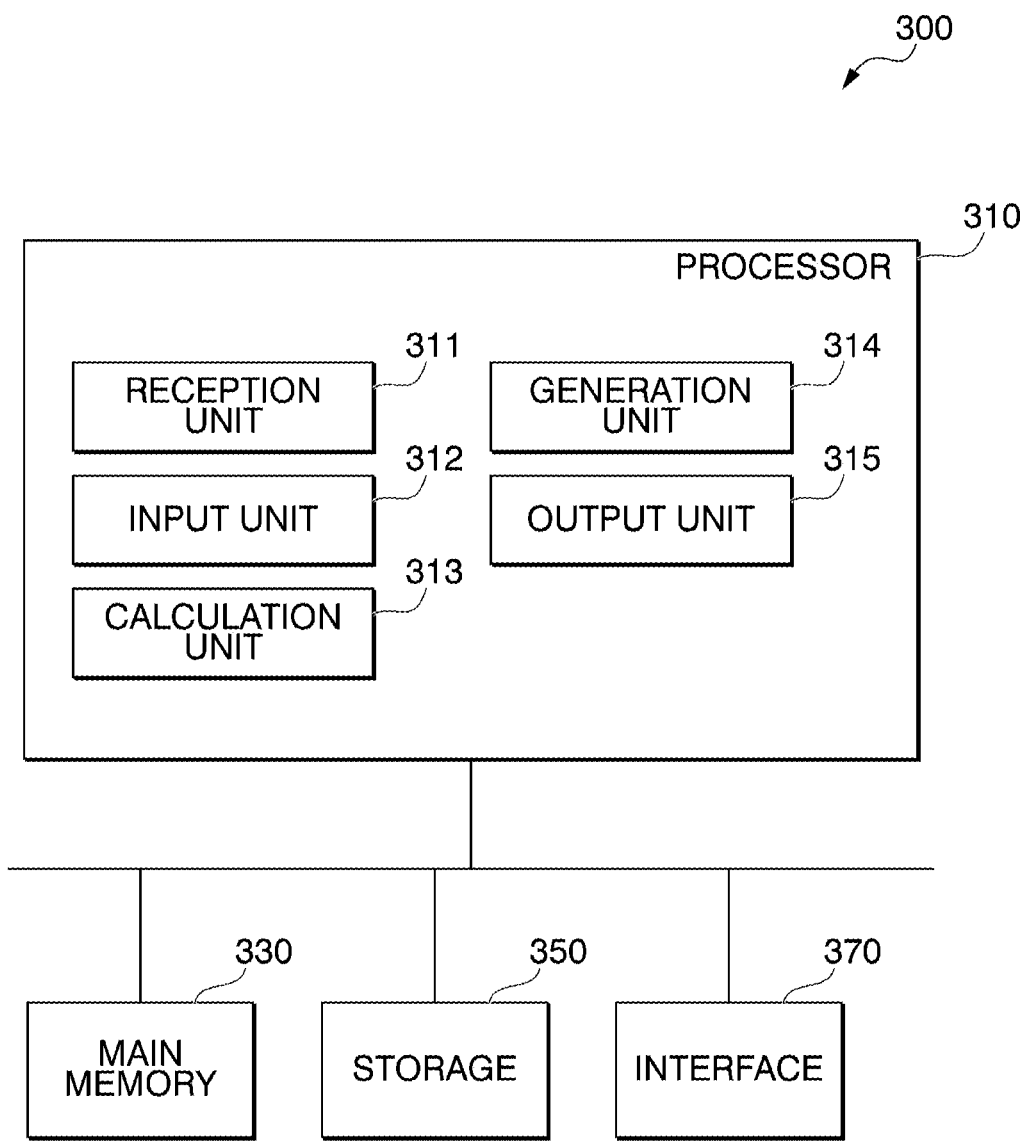
FIG. 4 is a schematic block diagram showing a configuration of a report generation device according to the first embodiment.

FIG. 4 is a schematic block diagram showing a configuration of the report generation device 300 according to the first embodiment.

The report generation device 300 is a computer that includes a processor 310, a main memory 330, a storage 350, and an interface 370.

The storage 350 is a non-transitory tangible storage medium. Exemplary examples of the storage 350 include a magnetic disk, an optical disk, a magneto-optical disk, and a semiconductor memory. The storage 350 may be an internal medium directly connected to a bus of the report generation device 300, or an external medium connected to the report generation device 300 via the interface 370 or a communication line. The storage 350 stores a program for generating the incident report.

The program may be a program for realizing some of the functions exerted by the report generation device 300. For example, the program may exert the functions in combination with another program already stored in the storage 350, or in combination with another program mounted on another device. In addition, in another embodiment, the report generation device 300 may include a custom LSI in addition to or in place of the configuration described above. In this case, some or all of the functions realized by the processor may be realized by an integrated circuit.

Map data of the operation site is recorded in the storage 350 in advance.

The processor 310 functions as a reception unit 311, an input unit 312, a calculation unit 313, a generation unit 314, and an output unit 315 by executing the program.

The reception unit 311 receives the warning history data and the history data including the position history data during the operation from the work machine 100. The reception unit 311 records the received history data in the storage 350.

The input unit 312 receives the input of an evaluation target of the incident report from the user terminal 500. The evaluation target is designated by a period related to the evaluation, and the identification information of the operator or the identification information of the operation site.

The calculation unit 313 calculates a score indicating the magnitude of each of a plurality of the incident risks related to the input evaluation period and evaluation target, based on the warning history data received by the reception unit 311.

In addition, the calculation unit 313 calculates a value used for generating the incident report based on the warning history data received by the reception unit 311 and the calculated score.

In addition, the calculation unit 313 calculates a staying time of the work machine 100 in each area of the operation site, which will be described below, based on the position history data during the operation received by the reception unit 311.

The generation unit 314 generates the incident report data indicating the incident report based on the calculation result by the calculation unit 313.

The output unit 315 outputs the incident report data generated by the generation unit 314 to the user terminal 500.

<<Calculation Method of Score>>

Here, an exemplary example of a calculation method of the score related to the incident risk by the calculation unit 313 will be described.

For example, the calculation unit 313 calculates the score related to the unstable posture by the following procedure. The calculation unit 313 calculates the posture of the work machine and the position of the center of gravity in that posture based on the measurement values of the inclination detector 102, the boom angle sensor 105, the arm angle sensor 106, and the bucket angle sensor 107, and the shape, the weight, and the position of the center of gravity of each portion of the known work machine, in the warning history data. The calculation unit 313 calculates the score such that as a horizontal component and a vertical component of the distance between the position of the center of gravity and the ground plane of the work machine 100 is longer, the value is smaller. That is, as the position of the center of gravity is positioned outside the ground plane of the work machine and the position of the center of gravity is farther from the ground surface, the score is smaller. In addition, the calculation method of the score is not limited to this, and the calculation unit 313 according to another embodiment may obtain a zero moment point of the work machine 100 based on the warning history data and calculate the score based on the dynamic stability, for example.

For example, the calculation unit 313 calculates the score related to the reversal of the orientation of the undercarriage 110 such that as the measurement value of the swing angle sensor 104 is closer to ±0 degrees, the value is larger, and as the measurement value thereof is closer to 180 degrees, the value is smaller.

For example, the calculation unit 313 calculates the score related to ignoring the warning such that as the elapsed time from the time when the warning device issues the warning to the time when the warning is released is longer, the value is smaller.

<<Exemplary Example of Incident Report>>

Figure 5:
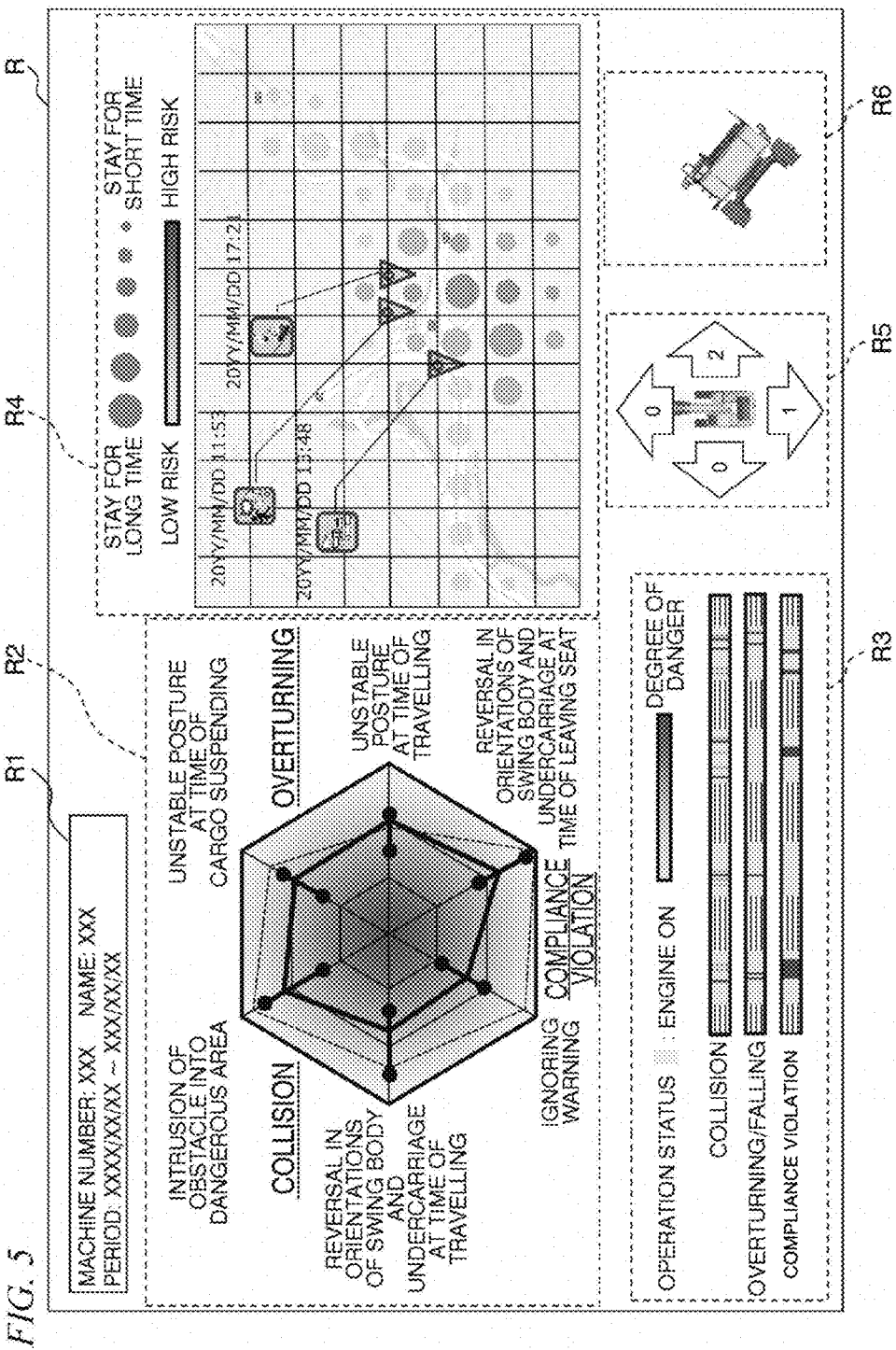
FIG. 5 is a diagram showing an exemplary example of an incident report according to the first embodiment.

FIG. 5 is a diagram showing an exemplary example of an incident report R according to the first embodiment.

The incident report R includes evaluation target information R1, a radar chart R2, a time chart R3, an operation area map R4, an inclination frequency image R5, and an inclination posture image R6.

The evaluation target information R1 is information representing the evaluation target related to the incident report R. The evaluation target information R1 includes a machine number of the work machine 100, a name of the operator, and the evaluation period.

The radar chart R2 represents the score for each of the plurality of incident risks. The radar chart R2 represents an average score, a maximum score, and a minimum score of the operator related to the evaluation target, and an average score of a plurality of the operators.

The time chart R3 represents temporal changes of the scores of the plurality of incident risks during the evaluation period.

The operation area map R4 represents the staying time of the work machine 100 in each area of the operation site, the magnitude of the risk in each area, and the position in which the score related to each incident risk is minimized, that is, the position in which the risk is maximized. In the exemplary example shown in FIG. 5, the operation area map R4 includes a map representing the operation site, a grid that divides the operation site into a plurality of areas, an object indicating the staying time and the magnitude of the risk in each area, and a pin indicating the position at which the incident risk is maximized. That is, the report generation device 300 is an exemplary example of the operation area presentation device.

The inclination frequency image R5 represents the number of times that the warning related to the overturning risk of the work machine 100 for each inclination direction is issued. Specifically, the inclination frequency image R5 includes a machine image, a front-side detection image, a rear-side detection image, a left-side detection image, and a right-side detection image. The machine image represents the work machine 100. The front-side detection image is disposed on the front side of the machine image (upper side in FIG. 5) and represents the number of times the warning of the overturning risk is issued at the time of forward inclination. The rear-side detection image is disposed on the rear side of the machine image (lower side in FIG. 5) and represents the number of times the warning of the overturning risk is issued at the time of rearward inclination. The left-side detection image is disposed on the left side (left side in FIG. 5) of the machine image and represents the number of times the warning of the overturning risk is issued at the time of leftward inclination. The right-side detection image is disposed on the right side (right side in FIG. 5) of the machine image and represents the number of times the warning of the overturning risk is issued at the time of rightward inclination.

The inclination posture image R6 represents the posture of the work machine 100 when the score related to the overturning risk is maximized. That is, the inclination posture image R6 represents the posture of the work machine 100 when an inclination angle of the work machine 100 with respect to the horizontal plane is largest in the period indicated by the evaluation target information R1.

<<Operation of Control Device 190>>

The acquisition unit 211 of the control device 190 of the work machine 100 acquires the measurement values from various sensors according to a predetermined sampling cycle during the operation of the work machine 100. The determination unit 212 determines the presence or absence of the incident risk based on the measurement value, and in a case of determining that there is the incident risk, outputs the instruction for outputting the warning to the warning device. The transmission unit 213 transmits the history data, such as the warning history data or the position history data during the operation, to the report generation device 300. The warning history data is generated when the determination unit 212 outputs the instruction for outputting the warning. In addition, the position history data during the operation is generated at predetermined time intervals during the operation of the work machine 100. The reception unit 311 of the report generation device 300 receives the history data from the work machine 100 and records the received history data in the storage 350. As a result, the history data of a plurality of the work machines 100 is collected in the storage 350 of the report generation device 300.

<<Operation of Report Generation Device 300>>

Figure 6:
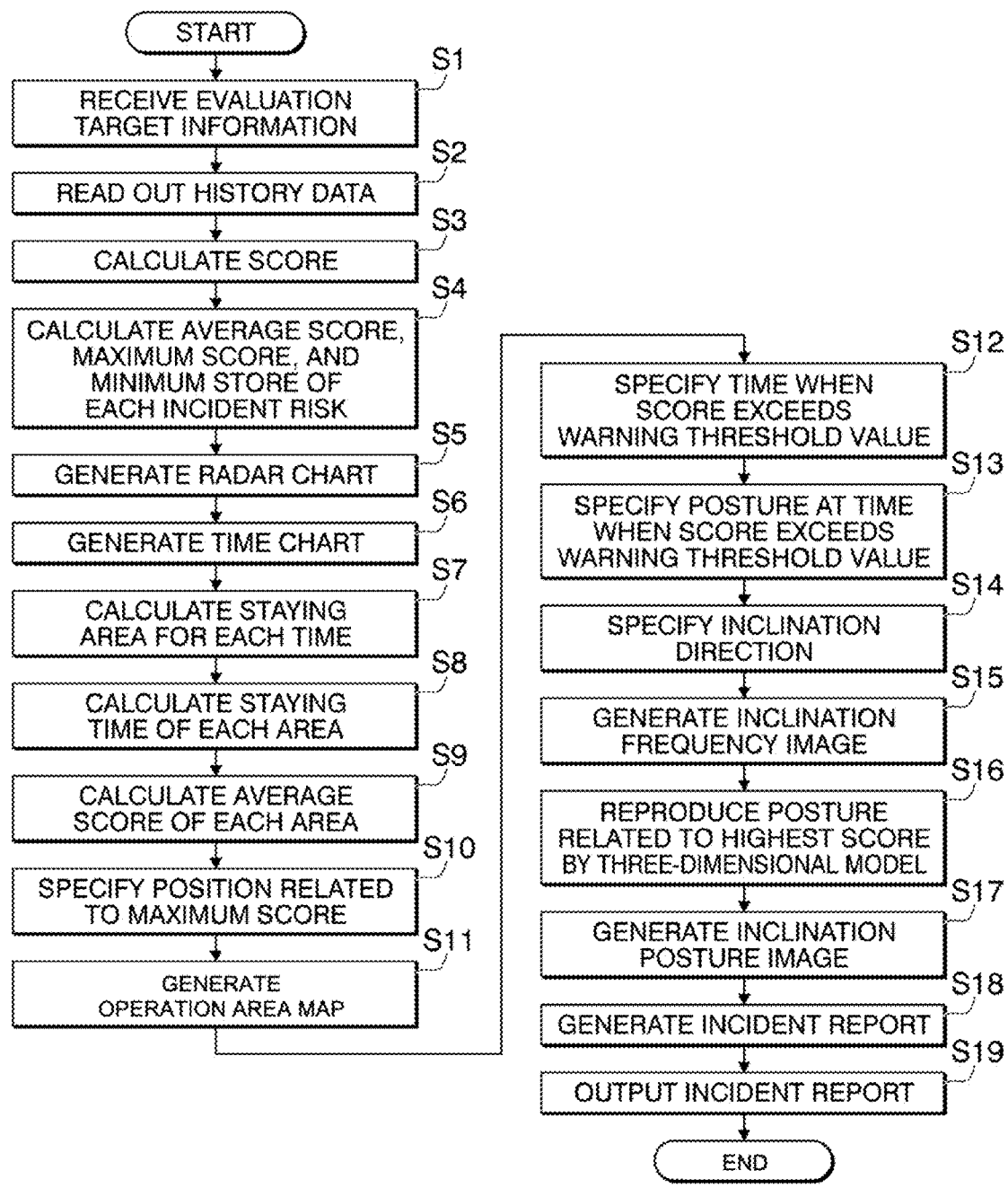
FIG. 6 is a flowchart showing an operation of the report generation device according to the first embodiment.

FIG. 6 is a flowchart showing an operation of the report generation device 300 according to the first embodiment.

By manipulating the user terminal 500 to access the report generation device 300, the user transmits an instruction for generating the incident report to the report generation device 300. Exemplary examples of the user of the report generation device 300 include the operator of the work machine 100 and the manager of the operation site.

The input unit of the report generation device 300 responds to the access and receives the input of the information of the evaluation target related to the incident report (step S1). Exemplary examples of the information of the evaluation target include the identification information of the operator or the identification information of the operation site related to the evaluation target, and the evaluation period. In addition, in a case in which the identification information of the operator is input as the evaluation target, the incident report related to individual operator is generated, and in a case in which the identification information of the operation site is input, the incident report related to the plurality of work machines 100 that are operated at the operation site or the operator is generated.

In a case in which the user manipulates the user terminal 500 to input the information of the evaluation target to the report generation device 300, the calculation unit 313 reads the history data related to the input evaluation target out of the storage 350 (step S2). For example, the calculation unit 313 reads the information associated with the identification information of the operator or the identification information of the operation site related to the evaluation target, and the evaluation period, out of the history data stored in the storage 350. The calculation unit 313 calculates, for each time related to the evaluation period, the score of each incident risk at each time based on the warning history data in the read out history data (step S3). In addition, in a case in which the warning is not output due to causing no incident risk at a certain time, the warning history data related to the relevant time is not present. In this case, the calculation unit 313 sets the score related to the relevant time as the minimum value.

Then, the calculation unit 313 calculates the average score, the maximum score, and the minimum score for each incident risk (step S4). The generation unit 314 generates the radar chart R2 based on the average score, the maximum score, and the minimum score, which are calculated in step S4 (step S5).

Then, the generation unit 314 generates the time chart R3 representing the temporal change of the score of each incident risk based on the score calculated in step S3 (step S6).

Then, the calculation unit 313 calculates the area in which the work machine 100 has stayed for each time based on the position history data during the operation read out in step S2 (step S7). Then, the calculation unit 313 calculates the staying time in each area by integrating the staying time in each area (step S8). The calculation unit 313 associates the score calculated in step S3 with the area based on the staying time in each area to calculate the average score of each area (step S9). The calculation unit 313 specifies the maximum score of each incident risk among the scores calculated in step S3 to specify the position related to the score (step S10). For example, the calculation unit 313 specifies the time related to the maximum score to specify the position associated with the staying time specified in step S7 as the position related to the maximum score.

The generation unit 314 generates the operation area map R4 by dividing the map representing the operation site stored in the storage 350 into the plurality of areas by the grid, disposing the object having the size corresponding to the staying time calculated in step S8 and the color corresponding to the average score calculated in step S9 in the grid related to each area, and further disposing the pin at the position specified in step S10 (step S11).

The calculation unit 313 specifies the time when the warning related to the overturning risk is issued based on the score calculated in step S3 (step S12). The calculation unit 313 specifies the posture of the work machine 100 at the time when the warning is issued by using the warning history data related to the specified time in the warning history data read out in step S2 (step S13). That is, the calculation unit 313 specifies the inclination angle of the work machine 100, the swing angle, and the angle of the work equipment 150 at the time when the warning is issued. For each time specified in step S12, the generation unit 314 specifies the direction in which the work machine 100 is most inclined among the front side, the rear side, the left side, and the right side of the work machine 100 based on the specified posture (step S14). Specifically, the calculation unit 313 obtains the inclination angle in the front-rear direction and the right-left direction based on the warning history data of the posture and specifies the inclination direction based on the inclination angle having the larger absolute value of the inclination angle in the front-rear direction and the inclination angle in the right-left direction.

The generation unit 314 generates the inclination frequency image R5 by generating the front-side detection image, the rear-side detection image, the left-side detection image, and the right-side detection image based on the direction specified in step S14 and disposing each detection image around the machine image (step S15). In addition, the generation unit 314 specifies the posture related to the highest score among the postures specified in step S13 and reproduces the posture with a three-dimensional model of the work machine 100 (step S16). That is, the generation unit 314 determines an angle of each component of the three-dimensional model of the work machine 100 based on the posture related to the highest score. The generation unit 314 generates the inclination posture image R6 by disposing a line of sight in the direction specified in step S14 and rendering the three-dimensional model (step S17).

The generation unit 314 generates the incident report R by using the evaluation target information R1 received in step S1, the radar chart R2 generated in step S5, the time chart R3 generated in step S6, the operation area map R4 generated in step S11, the inclination frequency image R5 generated in step S15, and the inclination posture image R6 generated in step S17 (step S18). The output unit 315 outputs the incident report data related to the generated incident report R to the user terminal 500 that receives the access in step S1 (step S19).

It is possible for the user of the user terminal 500 to visually recognize the incident report R and recognize the incident risk by displaying or printing the incident report data received by the user terminal 500. In addition, the user can distribute the displayed or printed incident report R to the operator to allow the operator to recognize the incident risk.

<<Action and Effect>>

As described above, according to the first embodiment, the report generation device 300 calculates the staying time of the work machine 100 for each of the plurality of areas of the operation site based on the position history data during the operation received from the work machine 100 and generates the operation area map R4 obtained by mapping the staying time for each area to the map of the operation site. As a result, it is possible for the user to recognize which area of the operation site the work machine 100 stays for a long time by visually recognizing the operation area map R4. Therefore, by visually recognizing the operation area map R4, the user can easily recognize whether the incident risk is caused by an inappropriate manipulation of the work machine 100 or is caused by the work machine 100 being present in an area having a high possibility of the incident risk. For example, in a case in which there is the incident risk while the work machine 100 stays in the area having a high possibility of the incident risk for a long time, the operator or the manager can infer that there is a low possibility in that the incident risk was caused by an inappropriate manipulation of the work machine 100. In addition, for example, in a case in which there is the incident risk even though the work machine 100 stays in the area having a low possibility of the incident risk for a long time, the user can infer that there is a high possibility in that the incident risk was caused by an inappropriate manipulation of the work machine 100.

In addition, according to the first embodiment, the report generation device 300 receives the warning history data of the work machine 100, calculates the magnitude of the incident risk of the work machine 100 for each of the plurality of areas, and maps the staying time and the magnitude of the incident risk for each area to the operation area map R4. As a result, by visually recognizing the operation area map R4, it is possible for the user to easily recognize whether the incident risk was caused by an inappropriate manipulation of the work machine 100 or was caused by the work machine 100 being present in an area having a high possibility of the incident risk.

In addition, in the first embodiment, the report generation device 300 specifies the magnitude of the incident risk for each of the plurality of areas based on the warning history data transmitted from the work machine 100, but the configuration is not limited to this in another embodiment. For example, in another embodiment, the control device 190 of the work machine 100 may calculate the score from the warning history data to generate a score history data and transmit the generated score history data to the report generation device 300. In this case, the report generation device 300 can specify the magnitude of the incident risk for each of the plurality of areas based on the received score history data. That is, the warning history data, the score history data, and the position history data during the operation based on the measurement values of the various sensors are all exemplary examples of the history data related to the incident risk of the work machine 100.

In addition, in the first embodiment, the staying time for each area is calculated by the report generation device 300 based on the position history data during the operation transmitted from the work machine 100; however, the configuration is not limited to this. The staying time for each area may be calculated by the work machine 100, and the calculation result may be transmitted to the report generation device 300.

In addition, according to the first embodiment, the report generation device 300 calculates the number of times the work machine 100 detects the overturning risk for each inclination direction and generates the inclination frequency image R5 representing the number of times the work machine 100 detects the overturning risk for each inclination direction. As a result, it is possible for the user to recognize the inclination direction of the work machine 100 having a high overturning risk for each operator or each work site by visually recognizing the inclination frequency image R5. For example, by visually recognizing the inclination frequency image R5, it can be seen that the operator has a driving habit that increases the overturning risk to the left side, or that there is an area in which the overturning risk to the rear side is high at the operation site.

In addition, the report generation device 300 according to the first embodiment obtains the inclination angle in the front-rear direction and the right-left direction based on posture data and specifies the inclination direction based on the inclination angle having the larger absolute value of the inclination angle in the front-rear direction and the inclination angle in the right-left direction. As a result, the report generation device 300 can divide the inclination direction of the work machine 100 into four directions of the front side, the rear side, the left side, and the right side.

In addition, according to the first embodiment, the report generation device 300 generates the inclination posture image R6 representing the posture of the work machine 100 based on the posture data of the work machine 100 when the work machine 100 detects the overturning risk. As a result, it is possible for the user to objectively recognize the posture of the work machine 100 when the overturning risk is high by visually recognizing the inclination posture image R6.

The inclination posture image R6 according to the first embodiment is generated based on the posture data when the inclination angle of the work machine 100 with respect to the horizontal plane is largest, in the posture data related to the overturning risk detected within the input evaluation period. That is, the inclination posture image R6 represents a state in which it is visually most easily understood that a possibility of overturning is high among the postures of the work machine 100 when there is the overturning risk. As a result, the report generation device 300 can allow the work machine 100 to strongly recognize the overturning risk. In addition, in another embodiment, the incident report R may include the inclination posture image R6 at the time of issuing each of a plurality of the warnings.

In addition, in the first embodiment shown in FIG. 5, the aspect has been described in which the inclination posture image R6 is displayed by omitting the work equipment 150 of the work machine 100, but the work equipment 150 may be displayed without being omitted.

In addition, as the inclination posture image R6, the orientation of the swing body 130 with respect to the undercarriage 110 or the posture of the work equipment 150 with respect to the swing body 130 when the inclination angle of the work machine 100 is largest may also be calculated and displayed based on the measurement values.

Further, rather than displaying the inclination posture image R6 in a stationary state, the inclination posture image R6 may be displayed as a moving image of the posture change for a predetermined period before and after (for example, 10 seconds before and after) when the inclination angle of the work machine 100 is largest.

The inclination posture image R6 according to the first embodiment is generated based on a viewpoint in which the inclination of the work machine 100 with respect to the horizontal plane is maximized in a plan view from the horizontal direction. As a result, the report generation device 300 can visually and easily represent the direction of the inclination and the magnitude of the work machine 100.

<<Another Embodiment>>

Although the embodiment has been described in detail with reference to the drawings, a specific configuration is not limited to the above, and various design changes and the like can be made. That is, in another embodiment, an order of the processing described above may be changed as appropriate. In addition, some processing may be executed in parallel.

The report generation device 300 according to the embodiment described above may be configured by a single computer, or the configuration of the report generation device 300 may be disposed so as to be divided into a plurality of computers, and the plurality of computers may cooperate with each other to function as the report generation device 300. In this case, some of the computers configuring the report generation device 300 may be mounted inside the work machine 100, and the other computers may be provided outside the work machine 100.

In addition, according to the first embodiment, in the operation area map R4, the object representing the magnitude of the incident risk and the staying time in the area is disposed in the portion corresponding to each area of the map of the operation site. As a result, it is possible for the operator or the manager to intuitively recognize the magnitude of the incident risk and the staying time in each area of the operation site.

On the other hand, in another embodiment, the report generation device 300 may represent the magnitude of the incident risk and the staying time by another method. For example, in another embodiment, a height of the object in the operation area map R4 may represent the staying time in the area, and the color may represent the magnitude of the incident risk. That is, the report generation device 300 may represent the staying time in each area as a three-dimensional bar graph.

In addition, in another embodiment, the object of the operation area map R4 may be a text, the staying time may be represented by the text, and the magnitude of the incident risk may be represented by the text color of the numeral or the background color.

In another embodiment, the area may not be divided by the grid, the staying time for each position may be indicated by a continuous three-dimensional curved surface graph, and the magnitude of the incident risk may be represented by the color of the curved surface.

In addition, in another embodiment, the staying time of the work machine 100 at the operation site may be represented by a curve having a thickness corresponding to a speed of the work machine 100 and tracing the track of the work machine 100. In this case, the magnitude of the incident risk is represented by the color of the curve, for example.

In addition, in another embodiment, the color of the object may represent the staying time, and the size of the object may represent the magnitude of the incident risk. For example, the staying time may be represented by a heat map or isolines.

In addition, according to the first embodiment, the front-side detection image, the rear-side detection image, the left-side detection image, and the right-side detection image included in the inclination frequency image R5 are each configured by an arrow representing the direction and the numeral indicating the number of warnings; but the configuration is not limited to this in another embodiment. For example, the front-side detection image, the rear-side detection image, the left-side detection image, and the right-side detection image according to another embodiment may not include the arrow. Since each image is disposed on the front side, the rear side, the left side, and the right side of the machine image, it is possible for the user to recognize the inclination direction even though the arrow is not included. In addition, the report generation device 300 according to another embodiment may enlarge and display the numeral as the number of warnings is increased.

In addition, the front-side detection image, the rear-side detection image, the left-side detection image, and the right-side detection image according to another embodiment may not include the numeral. In this case, the report generation device 300 may represent the number of warnings by the size of the arrow or the number of arrows.

In addition, the inclination frequency image R5 according to another embodiment may include a graph continuously representing a relationship between the inclination direction and the number of warnings instead of the front-side detection image, the rear-side detection image, the left-side detection image, and the right-side detection image. In this case, the graph may represent the number of warnings by a line or color indicating that the number of times is increased as the distance from the machine image is increased.

In addition, according to the first embodiment, the inclination posture image R6 is an image rendered by reproducing the posture of the work machine 100 at the time of issuing the warning by the three-dimensional model and so as to be the inclination angle with respect to the horizontal plane largest; but the configuration is not limited to this in another embodiment. For example, the inclination posture image R6 according to another embodiment may be an image obtained by rendering the three-dimensional model from a fixed line of sight.

In addition, for example, the inclination posture image R6 according to another embodiment may include two images obtained by rendering the three-dimensional model from a lateral surface side and a front surface side of the work machine 100.

In addition, for example, the inclination posture image R6 according to another embodiment may be an image obtained by inclining a two-dimensional image of the work machine 100 according to the measurement value of the inclination angle.

In addition, for example, the inclination posture image R6 according to another embodiment may be an image obtained by inclining and rendering a rectangular parallelepiped representing the work machine 100 according to the measurement value of the inclination angle.

In addition, for example, the inclination posture image R6 according to another embodiment may include the image representing the inclination angles in the front-rear direction and the right-left direction by numerals or graphs rather than including the image of the work machine 100.

In addition, for example, the inclination posture image R6 according to another embodiment may be an image of a spirit level representing the posture of the work machine 100. The image of the spirit level may include, for example, a horizontal line, a straight line indicating the inclination angle of the work machine 100, and an angle range related to a warning threshold value. As a result, it is possible for the user to recognize how much the inclination angle at the time of issuing the warning is inclined with respect to the warning threshold value.

INDUSTRIAL APPLICABILITY

According to the present disclosure described above, the operator and the manager can recognize which area of the operation site the work machine stays for a long time by visually recognizing the operation area map. Therefore, by visually recognizing the operation area map, the operator or the manager can easily recognize whether the incident risk is caused by an inappropriate manipulation of the work machine or is caused by the work machine being present in an area having a high possibility of the incident risk.

REFERENCE SIGNS LIST

1: Risk management system
100: Work machine
101: Position/azimuth direction detector
102: Inclination detector
103: Travel acceleration sensor
104: Swing angle sensor
105: Boom angle sensor
106: Arm angle sensor
107: Bucket angle sensor
108: Imaging device
110: Undercarriage
130: Swing body
150: Work equipment
151: Boom
152: Arm
153: Bucket
170: Cab
190: Control device
210: Processor
230: Main memory
250: Storage
270: Interface
211: Acquisition unit
212: Determination unit
213: Transmission unit
300: Report generation device
310: Processor
330: Main memory
350: Storage
370: Interface
311: Reception unit
312: Input unit
313: Calculation unit
314: Generation unit
315: Output unit
500: User terminal
R: Incident report
R1: Evaluation target information
R2: Radar chart
R3: Time chart
R4: Operation area map
R5: Inclination frequency image
R6: Inclination posture image

What is claimed is:

1. An operation area presentation device comprising:
a plurality of detectors that:
 calculate a position of a swing body of a work machine in a site coordinate system and an azimuth direction in which the swing body faces;
 measure an acceleration and an angular velocity of the swing body and detects the inclination of the swing body with respect to a horizontal plane based on the measurement result;
 detect acceleration related to traveling of the work machine; and
 detect swing angles of the work machine undercarriage and the swing body, and
a processor, the processor being configured to:
 receive history data of a position of an operation site in which the work machine is present;
 receive warning history data related to a predetermined incident risk of the work machine;
 calculate a staying time of the work machine for each of a plurality of areas of the operation site;
 calculate magnitude of the predetermined incident risk of the work machine for each of the plurality of areas;
 generate an operation area map obtained by mapping the staying time for each of the plurality of areas to a map of the operation site;
 generate the operation area map by mapping the staying time and the magnitude of the predetermined incident risk for each of the plurality of areas to the map of the operation site; and
 output the generated operation area map,
wherein the work machine is controlled for a plurality of time periods to acquire data history of the work machine wherein the historical data acquisition is accomplished by:
 calculating a position of the swing body in a site coordinate system;
 measuring the angular velocity of the swing body; and
 detecting acceleration related to the traveling of the work machine.

2. The operation area presentation device according to claim 1,
wherein the generation unit is configured to generate the operation area map by disposing, in a portion corresponding to each area of the map of the operation site, an object representing the magnitude of the incident risk and the staying time in the area.

3. The operation area presentation device according to claim 2,
wherein the magnitude of the incident risk and the staying time are represented by a color and a size of the object.

4. An operation area presentation method comprising the steps of:
calculating a position of a swing body of a work machine in a site coordinate system and an azimuth direction in which the swing body faces;
measuring an acceleration and an angular velocity of the swing body and detects the inclination of the swing body with respect to a horizontal plane based on the measurement result;
detecting acceleration related to traveling of the work machine;
detecting swing angles of the work machine undercarriage and the swing body, and
controlling a work machine for a plurality of time periods to acquire data history of the work machine wherein the historical data acquisition is accomplished by:
 calculating a position of the swing body in a site coordinate system;
 measuring the angular velocity of the swing body; and
 detecting acceleration related to the traveling of the work machine;
receiving history data of a position of an operation site in which a work machine is present;
calculating a staying time of the work machine for each of a plurality of areas of the operation site;
calculating magnitude of the predetermined incident risk of the work machine for each of the plurality of areas;

generating an operation area map obtained by mapping the staying time for each of the plurality of areas to a map of the operation site;

generating the operation area map by mapping the staying time and the magnitude of the predetermined incident risk for each of the plurality of areas to the map of the operation site; and outputting the generated operation area map.

* * * * *